United States Patent
White

(10) Patent No.: US 9,188,225 B2
(45) Date of Patent: Nov. 17, 2015

(54) UNDERWATER SWIMMING POOL LIGHT REPAIR DEVICE

(71) Applicant: Drew K. White, Tuscaloosa, AL (US)

(72) Inventor: Drew K. White, Tuscaloosa, AL (US)

(*) Notice: Subject to any disclaimer, the term of this patent is extended or adjusted under 35 U.S.C. 154(b) by 21 days.

(21) Appl. No.: 13/887,413

(22) Filed: May 6, 2013

(65) Prior Publication Data

US 2013/0292912 A1 Nov. 7, 2013

Related U.S. Application Data

(63) Continuation of application No. 12/973,440, filed on Dec. 20, 2010, now abandoned.

(51) Int. Cl.
| | |
|---|---|
| *F16J 15/02* | (2006.01) |
| *E04H 4/14* | (2006.01) |
| *F21S 8/00* | (2006.01) |
| *F21W 131/401* | (2006.01) |

(52) U.S. Cl.
CPC ............... *F16J 15/02* (2013.01); *E04H 4/148* (2013.01); *F21S 8/00* (2013.01); *F21W 2131/401* (2013.01); *Y10T 29/49719* (2015.01)

(58) Field of Classification Search
CPC ... F16J 15/061; F16J 15/0825; F16J 15/0831; F16J 15/2015; E04H 4/148; F21S 8/00; F21W 2131/401; Y10T 29/49719
USPC ......... 277/637, 598, 609, 616, 630, 602, 606, 277/651
See application file for complete search history.

(56) References Cited

U.S. PATENT DOCUMENTS

| | | | | |
|---|---|---|---|---|
| 1,641,377 | A | * | 9/1927 | Eisenhauer .................... 384/132 |
| 2,945,709 | A | * | 7/1960 | Freed et al. .................... 277/511 |
| 3,599,990 | A | * | 8/1971 | Greiner et al. ................. 277/370 |
| 4,402,516 | A | | 9/1983 | Gans et al. |
| 4,622,436 | A | * | 11/1986 | Kinnan ........................ 174/77 R |
| 4,637,619 | A | | 1/1987 | Stansberry |
| 4,783,087 | A | * | 11/1988 | DeCore et al. ................ 277/598 |
| 5,211,412 | A | | 5/1993 | Sabel |
| 5,492,343 | A | * | 2/1996 | Smith et al. .................... 277/638 |
| 5,513,859 | A | | 5/1996 | Huber et al. |
| 5,560,619 | A | | 10/1996 | Acree |
| 6,039,323 | A | | 3/2000 | Mockenhaupt et al. |
| 6,045,140 | A | | 4/2000 | Morris, Jr. |
| 6,076,833 | A | | 6/2000 | Geshi |
| 6,257,592 | B1 | | 7/2001 | Hashizawa et al. |

(Continued)

OTHER PUBLICATIONS

Pool Tool Pool Light Wedge and Pool Light Niche Wedge, [online], [retrieved on Dec. 1, 2010], Retrived from bizrate.com website using Internet<URL: http://www.bizrate.com/swimming-pools-jacuzzis/swimming-pool-light-wedge/.

(Continued)

*Primary Examiner* — Kristina Fulton
*Assistant Examiner* — Nathan Cumar
(74) *Attorney, Agent, or Firm* — Jeremy A. Smith; Stephen H. Hall; Bradley Arant Boult Cummings LLP

(57) ABSTRACT

A sealing ring repair device for underwater swimming pool lights is designed to fit on the water side of a sealing ring. The repair device includes a top plate with a plurality of top plate screw holes sized and positioned to match the sealing ring screw holes. The top plate has an inner side, and a repair tab extends from the top plate inner side. The repair tab can be used to secure an underwater swimming pool light in place when the ring tab of the sealing ring is damaged.

13 Claims, 2 Drawing Sheets

(56) References Cited

U.S. PATENT DOCUMENTS

| | | |
|---|---|---|
| 6,508,471 B1 * | 1/2003 | Blau .............................. 277/313 |
| 6,651,989 B2 | 11/2003 | Johnson |
| 6,948,717 B1 | 9/2005 | Carr |
| 8,210,544 B2 | 7/2012 | Waddell et al. |
| 2003/0094770 A1 * | 5/2003 | Gomez ........................ 277/626 |
| 2003/0122324 A1 | 7/2003 | Chen |
| 2004/0100040 A1 | 5/2004 | Sakno |
| 2008/0012243 A1 | 1/2008 | Altwies et al. |
| 2009/0285624 A1 * | 11/2009 | Waddell et al. ................. 403/14 |
| 2011/0123319 A1 | 5/2011 | Eastwood et al. |
| 2012/0049466 A1 | 3/2012 | Nikolin et al. |

OTHER PUBLICATIONS

Light Wedge and Security Clip No. 132-A, [online], [retrieved on Dec. 1, 2010], Retrieved from Pool Tool Inc. website using Internet<URL:http://www.pooltool.com/catalog.php.

* cited by examiner

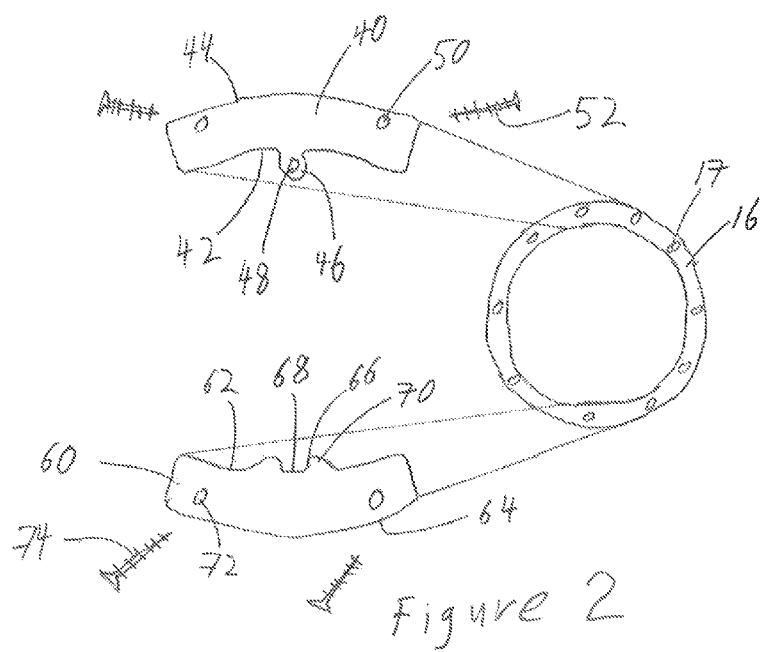
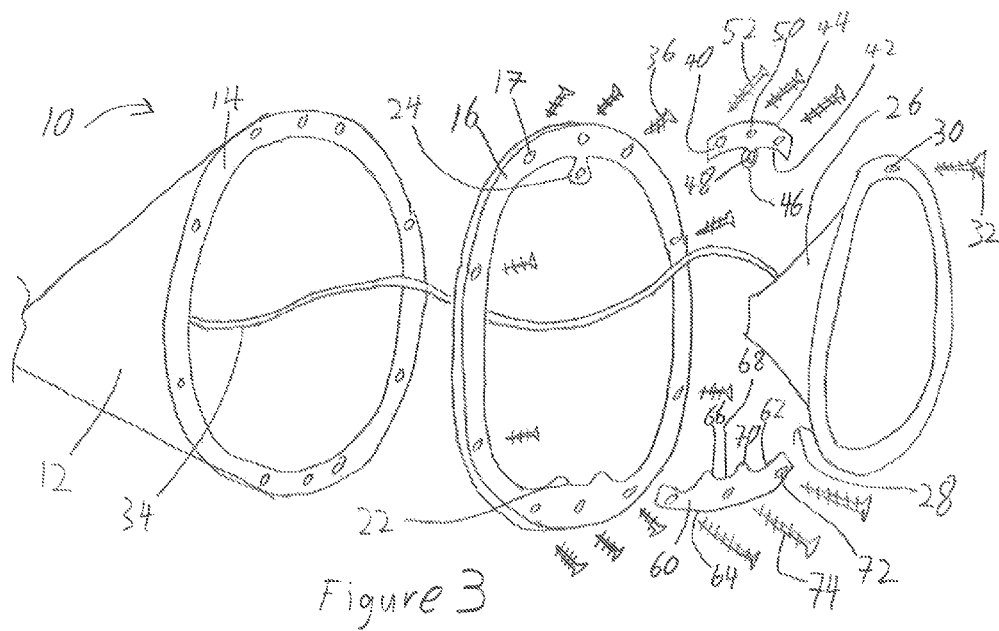

UNDERWATER SWIMMING POOL LIGHT REPAIR DEVICE a. CROSS REFERENCE TO RELATED APPLICATIONS

This application is a continuation of and therefore claims priority to, and the benefit of currently pending U.S. patent application Ser. No. 12/973,440 filed Dec. 20, 2010, entitled "Underwater Swimming Pool Light Repair Device."

b. FIELD OF THE INVENTION

The invention relates to repair devices for underwater swimming pool lights.

c. BACKGROUND OF THE INVENTION

Many swimming pools have underwater lighting for the safety and ambience of the swimmers. There are several different types of swimming pools and underwater swimming pool lights, but most underwater swimming pool lights include at least some of the same components. Many underwater swimming pool lights include a fixture, which is a water-tight enclosure that includes a bulb or other light producing device. An electrical cord penetrates the fixture through a water-tight seal. The fixture is affixed in the side (or bottom) of a swimming pool, and the user can turn on the light.

Underwater swimming pool lights are typically specially designed for use under water. For example, the design of the light producing device may depend on constant cooling of the lens used to separate the light producing device from the water, because the water in the pool serves to cool this lens. The light producing device may be particularly bright, because the light is intended to illuminate the water in the pool. Typically, underwater swimming pool light manufactures strongly recommend that only approved light producing devices designed for underwater swimming pool lights be used.

Special considerations apply to the design of an underwater swimming pool light fixture. The light is designed and intended to operate in an underwater environment, and it is important to isolate all electrical contacts from water ingress. However, the underwater swimming pool light fixture is intended to remain underwater essentially all the time, even when not in use. One does not remove an underwater swimming pool light from the pool when not in use. Therefore, the design of the fixture should be adequate to withstand extended immersion in water.

The underwater swimming pool light fixture is secured in place under the water line of a swimming pool. The water in the swimming pool can be corrosive, and can corrode the connectors and components used to secure the fixture in place. When this happens, the fixture can pull free from the position it was secured to, and float up to the top of the water surface. Most fixtures are lighter than water, so they will float if they are not flooded with water. A free-floating fixture is dangerous and unsightly. A floating fixture is exposed to increased chances of damage. Many pools have automatic "vacuum" machines for cleaning, and these can become entangled with a floating fixture. It is far more likely that an object falling into the pool will damaging a floating fixture than one secured into the pool wall. If the fixture is broken, water can enter the fixture and conduct electricity from newly exposed electrical contacts, creating a hazard for people in the swimming pool.

There are many types of swimming pool repairs for different circumstances. It is desirable to be able to make one type of needed repair without having to make other repairs. The ability to re-secure an underwater swimming pool light fixture that is no longer secured in place without having to repair or replace swimming pool vinyl liners or other components saves time and money.

d. BRIEF SUMMARY OF THE INVENTION

A sealing ring repair device for underwater swimming pool lights is designed to fit on the water side of a sealing ring. The repair device includes a top plate with a plurality of top plate screw holes sized and positioned to match the sealing ring screw holes. The top plate has an inner side, and a repair tab extends from the top plate inner side. The repair tab can be used to secure an underwater swimming pool light in place when the ring tab of the sealing ring is damaged.

e. BRIEF DESCRIPTION OF THE DRAWINGS

FIG. 2 is an exploded front view of one embodiment of the top plate and bottom plate of the current invention, as well as a damaged sealing ring.

FIG. 3 is a an exploded perspective view of an underwater swimming pool light with one embodiment of the top plate and bottom plate of the current invention.

f. DETAILED DESCRIPTION

Underwater Swimming Pool Light

Figure 1:
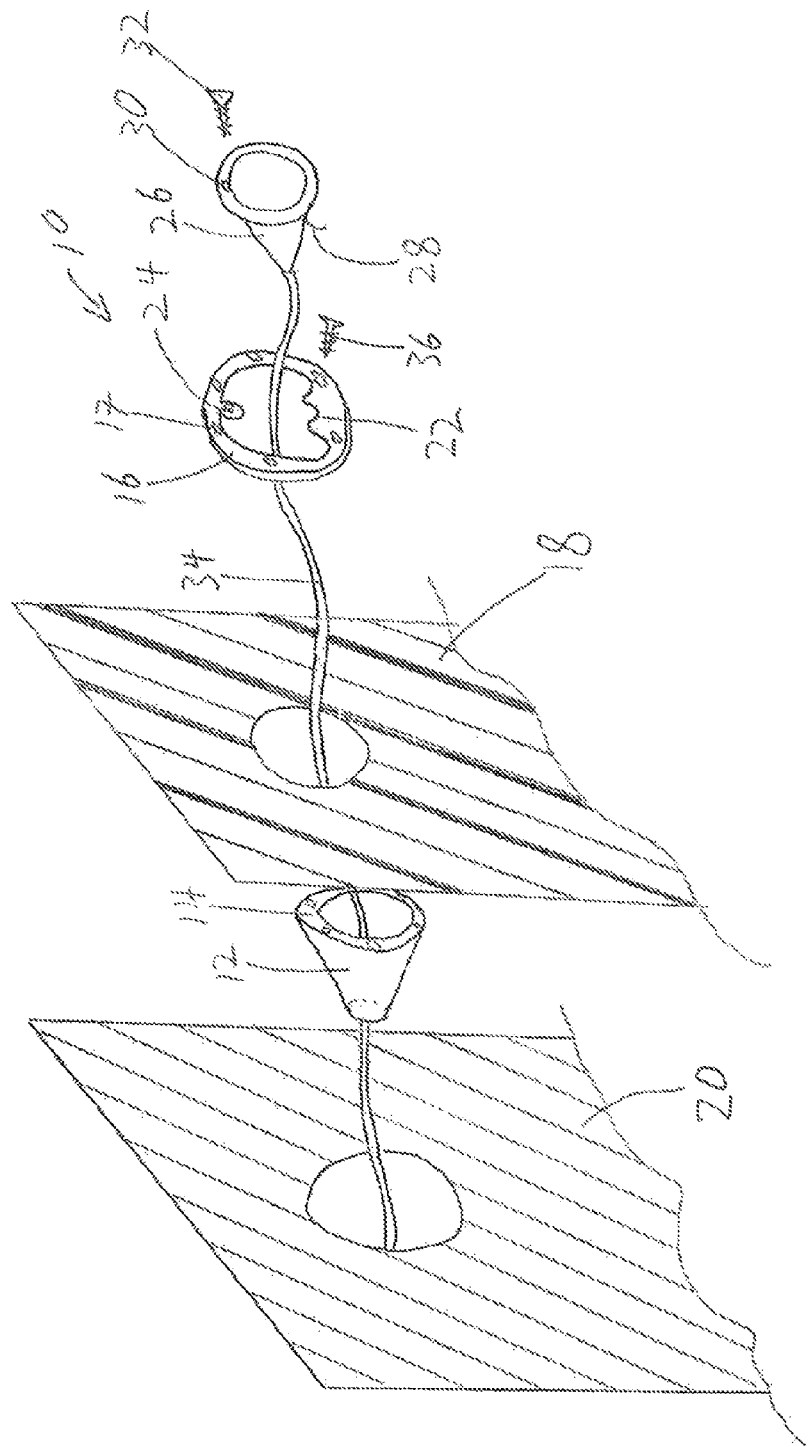
FIG. 1 is an exploded perspective view of one example of an underwater swimming pool light.

One embodiment of an Underwater swimming pool light 10 has several different structures, as seen in FIG. 1. In vinyl liner, fiberglass and gunite swimming pools, most light fixtures usually rest inside a metal or plastic housing referred to as an underwater niche 12. The niche 12 has a front rim 14 which faces inward towards the water in the swimming pool. In vinyl liner and fiberglass pools, the niche 12 incorporates a front sealing ring 16 to seal the vinyl liner 18 or fiberglass shell to keep the water from leaking behind the swimming pool wall 20. This sealing ring 16 uses a plurality of screws to hold the sealing ring 16 against the front rim 14 of the niche 12, sandwiching the vinyl liner 18 or fiberglass shell between the sealing ring 16 and the niche front rim 14. The sealing ring 16 includes a plurality of sealing ring screw holes 17, and a sealing ring connector 36 passes through the sealing ring screw holes 17 and into the front rim 14 to secure the sealing ring 16 to the niche 12. The sealing ring connector 36 can be a screw, bolt or other connector known to those skilled in the art.

Built in to this sealing ring 16 is a ring slot 22 at the 6 o'clock position and a ring tab 24 at the 12 o'clock position to hold the actual light fixture 26 into the niche 12. The fixture 26 comprises a hook 28 at the 6 o'clock position and a fixture pilot screw hole 30 at the 12 o'clock position. The hook 28 is secured in the ring slot, and a pilot screw 32 passes through the fixture pilot screw hole 30 and threads into the ring tab 24 to secure the fixture 26 in the niche 12. The hook 28 in the ring slot 22 prevents the fixture 26 from moving laterally, and the pilot screw 32 secures the top of the fixture 26 in place, so the fixture 26 is locked in position. The hook 28 forms a flexible connection with the sealing ring 16, so the fixture 26 can expand and contract independent from the sealing ring 16 or the niche 12, and yet the fixture 26 remains secured in place.

Certain reference terms are used in this description for the sake of clarity. The vinyl liner 18 essentially has two sides, and these are referred to as the "water" side and the "wall" side. The water side is the side that faces the water in the swimming pool, and is constantly wetted by the pool water. The wall side is opposite the water side, so the wall side faces and abuts the swimming pool wall 20. All other components use these same reference terms, so the sealing ring water side faces away front the niche 12, and the sealing ring wall side faces towards the niche 12.

On occasion, the ring tab 24 on the sealing ring 16 breaks or corrodes away leaving nowhere for the pilot screw 32 to grab in order to secure the light fixture 26 into the niche 12. Similarly, the ring slot 22 at the 6 o'clock position can also break or corrode away, which will prevent the light fixture 26 from being secured at the bottom of the niche 12. If a repair of some kind is not made, the fixture 26 often floats to the water surface because it is no longer secured to the sealing ring 16. This is unsightly and a hazard. The water supply hoses of automatic pool cleaners can wrap around the light cord 34 extending from the fixture 26 and cause damage to the fixture 26 or the water supply hoses.

It is risky to completely remove a sealing ring 16 with a damaged ring tab 24 or ring slot 22 to replace the whole sealing ring 16 because the vinyl liner 18 underneath the old sealing ring 16 can shift or shrink once the old, original sealing ring 16 is removed. If the vinyl liner 18 shifts or shrinks, it may be necessary to replace the entire vinyl liner 18, which is a lengthy and expensive task. Water leakage behind a fiberglass swimming pool wall 20 is also undesirable, so it is preferable to avoid removal of the entire sealing ring 16 to repair a damaged ring tab 24 or ring slot 22. The niche 12 on a gunite swimming pool often does not utilize a front sealing ring 16; it simply has a tab at the 12 o'clock position on the front rim 14 for the pilot screw to directly receive the light fixture.

Top Plate

A top plate 40 can be used to repair a damaged ring tab 24 without removing the sealing ring 16, as seen in FIG. 2, with continuing reference to FIG. 1. The top plate 40 has a top plate inner side 42 and a top plate outer side 44. In one embodiment, the top plate inner side 42 is concave, and the top plate outer side 44 is convex. In other embodiments, the top plate inner side 42 can be straight, convex, or many other shapes, and the top plate outer side 44 can be straight, concave, or many other shapes. The shape of the top plate inner side 42 does not necessarily have to match the shape of the top plate outer side 44, even though in some embodiments it does match.

The top plate 40 is used to repair a damaged ring tab 24. A repair tab 46 extends from the top plate inner side 42, and the repair tab 46 includes a threaded receptacle 48. The threaded receptacle 48 is sized and threaded to match the pilot screw 32. The top plate 40 also includes a top plate screw hole 50, where the top plate screw hole 50 can be sized to match the sealing ring screw hole 17. The top plate screw hole 50 is positioned in the main body of the top plate 40, as opposed to being positioned in the repair tab 46. In some embodiments, the top plate 40 comprises a plurality of top plate screw holes 50, where the top plate screw holes 50 are positioned to align with the sealing ring screw holes 17. In use, the top plate 40 is positioned at the 12 o'clock position of the sealing ring 16, so the position of the repair tab 46 can be set to coincide with the location of the ring tab 24 by the location, size, and alignment of the top plate screw holes 50.

The main body of the top plate 40 can be shaped to match an arc of the sealing ring 16. This means the top plate 40 is curved such that the top plate 40 has a radius of curvature which essentially matches the radius of curvature of the sealing ring 16. In this embodiment, the repair tab 46 extends down from the concave curved surface of the top plate 40, which is the top plate inner side 42. In some embodiments, the width of the top plate 40 can also be set to match the width of the sealing ring 16. A top plate 40 that is curved to match the sealing ring 16, and that has the same width as the sealing ring 16, provides a relatively large contact area between the top plate 40 and the sealing ring 16 without excess top plate material extending beyond the sealing ring 16. This can be beneficial because the lack of excess material minimizes the chance of "catching" an edge of the top plate 40, and the large surface contact area can increase the stability of the top plate 40, as well as provide for more strength than a smaller top plate 40.

The top plate 40 can include one or more top plate connectors 52, which can be a bolt, screw, or other connection device known to those skilled in the art. In practice, a sealing ring connector 36 can be replaced with a top plate connector 52 at each top plate screw hole 50, so the top plate connector 52 can be sized larger than the sealing ring connector 36 by at least the thickness of the top plate 40. The top plate 40 can include one top plate connector 52 for each top plate screw hole 50, or one or more extra top plate connectors 52 can be included just in case one is misplaced or lost.

The top plate 40 can be made of a metallic material to maintain proper electrical bonding of the fixture 26, but it is also possible to make the top plate 40 out of resin, plastic, or other materials. Grounding straps or cables, conductive inserts, or other techniques could be used for electrical bonding in conjunction with a non-conductive ma the top plate 40. It is also possible to use other non-metallic materials that are electrically conductive for the top plate 40. In one embodiment, the top plate 40 is made of stainless steel.

The top plate 40 can be provided in a plurality of sizes and configuration to match the underwater swimming pool lights 10 commercially available. As new underwater swimming pool light configurations are introduced to the market, new top plate sizes and configurations can be marketed to match the new lights 10. The top plate 40 can be shaped like an arc, so less material is needed than for a complete new sealing ring 16. This can reduce material costs, and also labor for installation time. The top plate 40 is intended to replace a damaged ring tab 24, as opposed to providing a seal around a niche 12, so a complete circular device is not needed. However, it is also possible to provide the top plate 40 as a complete circle, if desired.

Bottom Plate

A bottom plate 60 can be used to repair a damaged ring slot 22 without removing the sealing ring 16. The bottom plate 60 has a bottom plate inner side 62 and a bottom plate outer side 64. In one embodiment, the bottom plate inner side 62 is concave, and the bottom plate outer side 64 is convex. In other embodiments, the bottom plate inner side 62 can be straight, convex, or many other shapes, and the bottom plate outer side 64 can be straight, concave, or many other shapes. The shape of the bottom plate inner side 62 does not necessarily have to match the shape of the bottom plate outer side 64, even though it may match in some embodiments.

The bottom plate 60 is used to repair a damaged ring slot 22. A repair slot 66 extends from the bottom plate inner side 62, and the repair slot 66 can comprise a repair catch 68 positioned between two repair humps 70. The repair slot 66 is sized and shaped to match the hook 28, which can vary for different fixtures 26. The bottom plate 60 also includes a bottom plate screw hole 72, where the bottom plate screw hole 72 can be sized to match the sealing ring screw hole 17. The bottom plate screw hole 72 is positioned in the main body of the bottom plate 60, as opposed to being positioned in the repair slot 66. In some embodiments, the bottom plate 60 comprises a plurality of bottom plate screw holes 72, where the bottom plate screw holes 72 are positioned to align with the sealing ring screw holes 17. In use, the bottom plate 60 is positioned at the 6 o'clock position of the sealing ring 16, so the position of the repair slot 66 can be set to coincide with the location of the ring slot 22 by the location, size, and alignment of the bottom plate screw holes 72.

The main body of the bottom plate 60 can be shaped to match an arc of the sealing ring 16. This means the bottom plate 60 is curved such that the bottom plate 60 has a radius of curvature which essentially matches the radius of curvature of the sealing ring 16. In this embodiment, the repair slot 66 extends up from the concave curved surface of the bottom plate 60, which is the bottom plate inner side 62. In some embodiments, the width of the bottom plate 60 can also be set to match the width of the sealing ring 16. A bottom plate 60 that is curved to match the sealing ring 16, and that has the same width as the sealing ring 16, provides a large contact area between the bottom plate 60 and the sealing ring 16 without excess bottom plate material extending beyond the sealing ring 16. This can be beneficial because the lack of excess material minimizes the chance of "catching" an edge of the bottom plate 60, and the large surface contact area can increase the stability of the bottom plate 60, as well as provide for more strength than a smaller bottom plate 60.

The bottom plate 60 can include one or more bottom plate connectors 74, which can be a bolt, screw, or other connection device known to those skilled in the art. In practice, a sealing ring connector 36 can be replaced with a bottom plate connector 74 at each bottom plate screw hole 72, so the bottom plate connector 74 can be sized larger than the sealing ring connector 36 by at least the thickness of the bottom plate 60. The bottom plate 60 can include one bottom plate connector 74 for each bottom plate screw hole 72, or one or more extra bottom plate connectors 74 can be included just in case one is misplaced or lost.

The bottom plate 60 can be made of a metallic material to maintain proper electrical bonding of the fixture 26, but it is also possible to make the bottom plate 60 out of resin, plastic, or other materials. Grounding straps or cables, conductive inserts, or other techniques could be used for electrical bonding in conjunction with a non-conductive material in the bottom plate 60. It is also possible to use other nonmetallic materials that are electrically conductive for the bottom plate 60. In one embodiment, the bottom plate 60 is made of stainless steel.

The bottom plate 60 can be provided in a plurality of sizes and configuration to match the underwater swimming pool lights 10 commercially available. As new underwater swimming pool light configurations are introduced to the market, new bottom plate sizes and configurations can be marketed to match the new lights 10. The bottom plate 60 can be shaped like an arc, so less material is needed than for a complete new sealing ring 16. This can reduce material costs, and also labor costs for installation time. The bottom plate 60 is intended to replace a damaged ring slot 22, as opposed to providing a seal around a niche 12, so a complete circular device is not need. However, it is also possible to provide the bottom plate 60 as a complete circle, if desired.

Installation

The top and bottom plates 40, 60 are installed in essentially the same manner, as can be seen by referring to FIG. 3, with continuing reference to FIGS. 1 and 2. Installation of the top plate 40 is described below, but it is to be understood that the same installation process is used for the bottom plate 60 with a few minor exceptions, some of which are listed here. The bottom plate 60 is positioned at the 6 o'clock position with the repair slot 66 facing up, whereas the top plate 40 is positioned at the 12 o'clock position with the repair tab 46 facing down. The hook 28 is secured in the slot (whether the ring slot 22 or repair slot 66 is used) prior to the pilot screw 32 securing the fixture 26 to the tab (whether the ring tab 24 or the repair tab 46 is used.) References to a tab 24, 46 or pilot screw 32 for the top plate 40 coincide to references to a slot 22, 66 or hook 28 for the bottom plate 60. Depending on the condition of the sealing ring 16, one can install just the top plate 40, just the bottom plate 60, or both the top and bottom plates 40, 60, as needed. One skilled in the art will understand how to install the bottom plate 60 based on the following description of how to install the top plate 40.

A sealing ring 16 is provided without an attached underwater swimming pool light fixture 26, where there is a niche 12 positioned on the wall side of the sealing ring 16. This can be achieved by removing the fixture 26, or in some cases the fixture may have fallen out of the niche 12 on its own. The sealing ring 16 is then inspected to determine if the ring tab 24 is damaged. If the ring tab 24 is damaged, installation of the top plate 40 is recommended. The niche 12 is positioned on the wall side of the sealing ring 16, as described above.

The sealing ring connector(s) 36 which correspond to the top plate screw holes 50 are removed and set aside. One or more sealing ring connector(s) 36 can be removed, depending on the design of the top plate 40, and the sealing ring connectors 36 which are removed are positioned on a top portion of the sealing ring 16. A top plate 40 is selected that corresponds to the make and model of the existing sealing ring 16 and light fixture 26. The top plate 40 is then placed on the water side of the sealing ring 16 such that the top plate screw hole 50 is aligned with the sealing ring screw hole 17, and the repair tab 46 is aligned with the damaged ring tab 24. If the ring tab 24 is completely missing, reference can be made to extra, non-used sealing rings 16, reference manuals or books, or other sources for the original location of the missing ring tab 24. If the ring tab 24 is completely missing, the repair tab 46 is aligned with the former position of the ring tab 24. If the ring tab 24 is still present, it can be removed before installing the top plate 40. In certain cases, removal of the remaining ring tab 24 can minimize interference between the ring tab 24 and the repair tab 46 while engaging the pilot screw 32.

A connector 36, 52 is then engaged through the top plate screw hole 50 and the aligned sealing ring screw hole 17 such that the top plate 40 abuts the sealing ring 16 on the water side of the sealing ring 16. The connector 36, 52 may engage into the front rim 14 using a threaded connection, such as into a bolt positioned on the wall side of the front rim 14, or into threads formed in the front rim 14, or into other connectors as is understood by those skilled in the art. The connector used can be the sealing ring connector 36, the top plate connector 52, or another connector available from other sources. The top plate connector 52 provided can be longer than the sealing ring connector 17 by at least the thickness of the top plate 40. The connector 36, 52 can be used in one or more top plate screw holes 50, and a connector 36, 52 should be installed, tightened and secured in each top plate screw hole 50 present in the top plate 40.

The bottom plate 60 may be installed in a similar manner, if necessary. If both the ring tab 24 and ring slot 22 are damaged, both a top plate 40 and a bottom plate 60 can be installed. After the top plate 40 has been installed, the fixture 26 is secured in the niche 12 by positioning the hook 28 in the slot 22, 66, and then engaging a pilot screw 32 or other connector through the fixture pilot screw hole 30 into the threaded receptacle 48 in the newly installed repair tab 46. The light 10 can then be tested to verify it works properly.

While the invention has been described with respect to a limited number of embodiments, those skilled in the art, having the benefit of this disclosure, will appreciate that other embodiments can be devised which do not depart from the scope of the invention disclosed here. Accordingly, the scope of the invention should be limited only by the attached claims.

I claim:

1. A kit useful in the repair of a damaged underwater light fixture, the light fixture comprising a circular sealing ring having a plurality of screw holes, an exterior surface and a hook, the kit comprising:
    a metallic top plate in contact with and overlaying a portion of the circular sealing ring's exterior surface, wherein the top plate further comprises: (i) a plurality of top plate screw holes, (ii) a concave inner side with a repair tab extending downwardly therefrom and the repair tab further comprising a threaded receptacle configured to receive a pilot screw, said threaded receptacle located below the plurality of top plate screw holes and (ii) a convex outer side, wherein the top plate screw holes are configured to align with at least one of the sealing ring screw holes; and
    a metallic bottom plate in contact with and overlaying a different portion of the circular sealing ring's exterior surface than the top plate, wherein the bottom plate is located opposite the top plate, where the bottom plate has a left end and right end and further comprises: (i) a concave inner side, which further comprises a repair catch centered on the concave inner side bounded by a first repair hump and a second repair hump, wherein the first repair hump is equidistant from the left end as the second repair hump is from the right end of the bottom plate and wherein the repair catch receives the light fixture's hook and (ii) a convex outer side, wherein the bottom plate further comprises one or more screw holes configured to align with at least one of the sealing ring screw holes;
    wherein upon placing the top and bottom plates against the circular sealing ring's exterior surface at the 12 o'clock and 6 o'clock positions respectively, the top plate and bottom plate do not cover the entirety of the sealing ring's exterior surface.

2. A fastener device for securing an underwater light fixture to an underwater light fixture niche having a sealing ring comprising a plurality of sealing ring screw holes, the fastener device comprising:
    a metallic top plate having an inner side, where the top plate comprises a plurality of top plate screw holes sized to match the sealing ring screw holes, and where the top plate screw holes are positioned to align with the sealing ring screw holes, and wherein the top plate is configured to interface with, and be secured, to the sealing ring; and further comprises:
    a repair tab extending from the inner side of the top plate, where the repair tab includes a repair tab threaded screw receptacle configured to secure the underwater light fixture, wherein the repair tab threaded screw receptacle is located below the plurality of top plate screw holes.

3. The repair device of claim 2 where the top plate has the shape of an arc which is less than 180 degrees.

4. The fastener device of claim 3 wherein the top plate is curved such that the top plate has a radius of curvature which essentially matches the radius of curvature of the sealing ring, and where the repair tab extends from the inner side of the top plate.

5. The fastener device of claim 4 where the repair tab threaded screw receptacle is sized and threaded to match the size and threading of a ring tab of the sealing ring.

6. The fastener device of claim 5 further comprising a plurality of top plate connectors, where the top plate connectors have a length that is longer than a sealing ring connector by at least a thickness of the top plate.

7. The fastener device of claim 6 further comprising:
    a bottom plate having an inner side, where the bottom plate comprises a plurality of bottom plate screw holes sized to match the sealing ring screw hole size, and where the bottom plate screw holes are positioned to align with the sealing ring screw holes; and
    a repair slot extending from the inner side of the bottom plate, where the repair slot comprises a repair catch positioned between repair humps.

8. A fastener device for securing an underwater light fixture to an underwater light fixture niche having a sealing ring which further comprises a plurality of sealing ring screw holes, the fastener device comprising:
    a metallic bottom plate having an inner side, a left end and a right end, where the bottom plate comprises a plurality of bottom plate screw holes sized to match the sealing ring screw holes, and where the bottom plate screw holes are positioned to align with the sealing ring screw holes, and where the bottom plate is configured to interface with, and be secured to, the sealing ring; and
    a repair slot centered on the bottom plate and extending from the inner side of the bottom plate, the repair slot further comprising a repair catch position between two (2) repair humps wherein the first repair hump is the same distance away from the left end of the bottom plate as second repair hump is away from the right end of the bottom plate, wherein the repair slot is configured to receive a hook of the underwater light fixture.

9. The repair device of claim 8 where the bottom plate has the shape of an arc which is less than 180 degrees.

10. The repair device of claim 9 where the bottom plate is curved such that the bottom plate has a radius of curvature which essentially matches the radius of curvature of the sealing ring, and where the repair slot extends from the concave curved surface of the bottom plate.

11. The repair device of claim 10 where the repair slot is sized and shaped to match a sealing ring slot.

12. The repair device of claim 11 further comprising a plurality of bottom plate connectors, where the bottom plate connectors have a length that is longer than a sealing ring connector by at least a thickness of the bottom plate.

13. The repair device of claim 12 where the repair slot comprises a repair catch between repair humps, and where the repair humps extend from the bottom plate inner side.

* * * * *